(12) United States Patent  
Jun

(10) Patent No.: US 10,931,857 B2
(45) Date of Patent: Feb. 23, 2021

(54) APERTURE MODULE AND CAMERA MODULE INCLUDING THE SAME

(71) Applicant: Samsung Electro-Mechanics Co., Ltd., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/276,962

(22) Filed: Feb. 15, 2019

(65) Prior Publication Data

US 2020/0028998 A1 Jan. 23, 2020

(30) Foreign Application Priority Data

Jul. 20, 2018 (KR) ........................ 10-2018-0084735

(51) Int. Cl.
*H04N 5/225* (2006.01)

(52) U.S. Cl.
CPC ......... *H04N 5/2254* (2013.01); *H04N 5/2252* (2013.01); *H04N 5/2253* (2013.01); *H04N 5/2257* (2013.01)

(58) Field of Classification Search
None
See application file for complete search history.

(56) References Cited

U.S. PATENT DOCUMENTS

| 7,472,998 | B2 | 1/2009 | Sasazaki et al. | |
|---|---|---|---|---|
| 9,851,553 | B1* | 12/2017 | Stephenson | ........... H01F 7/1615 |
| 2002/0094204 | A1 | 7/2002 | Mizukami et al. | |
| 2005/0094291 | A1 | 5/2005 | Onishi et al. | |
| 2009/0034046 | A1* | 2/2009 | Bai | ........... G03B 9/10 |
| | | | | 359/230 |
| 2012/0044578 | A1* | 2/2012 | Murakami | ............ G02B 7/102 |
| | | | | 359/694 |
| 2012/0076486 | A1 | 3/2012 | Bai et al. | |
| 2015/0346583 | A1* | 12/2015 | Yoshizawa | ............... G03B 9/14 |
| | | | | 396/449 |

(Continued)

FOREIGN PATENT DOCUMENTS

| CN | 1365021 A | 8/2002 |
|---|---|---|
| CN | 204807883 U | 11/2015 |
| JP | 2006-72242 A | 3/2006 |

(Continued)

OTHER PUBLICATIONS

English translation of KR-20140146919 A Lim Soon et al (Year: 2014).*

(Continued)

*Primary Examiner* — James M Hannett
(74) *Attorney, Agent, or Firm* — NSIP Law

(57) ABSTRACT

A camera module includes: a housing including a lens module; an aperture module disposed on the lens module and configured to form an incidence hole having various sizes through a plurality of blades; and an aperture driving part including a magnet unit including a driving magnet facing a driving coil. The magnet unit is configured to linearly reciprocate. A first blade among the plurality of blades is connected to the magnet unit, and is connected to remaining blades among the plurality of blades by a gear to transmit driving force from the magnet unit to the remaining blades.

23 Claims, 10 Drawing Sheets

(56) References Cited

U.S. PATENT DOCUMENTS

2017/0324892 A1 11/2017 Kim et al.
2020/0007730 A1* 1/2020 Doi .......................... G03B 9/02

FOREIGN PATENT DOCUMENTS

| JP | 4107220 B2 | 6/2008 |
| KR | 10-2012-0032433 A | 4/2012 |
| KR | 10-2014-0146919 A | 12/2014 |
| KR | 10-1477247 B1 | 12/2014 |
| KR | 20140146919 A * | 12/2014 |
| KR | 10-1700771 B1 | 1/2017 |

OTHER PUBLICATIONS

Korean Office Action dated Nov. 11, 2019 in counterpart Korean Patent Application No. 10-2018-0084735 (7 pages in English and 6 pages in Korean).

Korean Office Action dated May 25, 2020 in the corresponding Korean Patent Application No. 10-2018-0084735 (7 pages in English, 6 pages in Korea).

Chinese Office Action dated Dec. 25, 2020 in counterpart Chinese Patent Application No. 201910400548.8 (10 pages in English, 8 pages in Chinese).

* cited by examiner

APERTURE MODULE AND CAMERA MODULE INCLUDING THE SAME

CROSS-REFERENCE TO RELATED APPLICATIONS

This application claims benefit under 35 U.S.C. § 119(a) of Korean Patent Application No. 10-2018-0084735 filed on Jul. 20, 2018 in the Korean Intellectual Property Office, the entire disclosure of which is incorporated herein by reference for all purposes.

BACKGROUND

1. Field

The following description relates to an aperture module and a camera module including an aperture module.

2. Description of Related Art

Recently, camera modules have been adopted as standard components in portable electronic devices such as smartphones, tablet PCs, notebook computers, and the like. General purpose digital cameras include a mechanical aperture to change an amount of incident light, according to image capturing environments. However, camera modules used in small products such as portable electronic devices may be difficult to separately provide with an aperture, due to structural characteristics of the camera module and limitations in space.

For example, various components for driving the aperture may increase the weight of the camera module and thereby degrade an autofocusing function. Further, when the aperture itself is provided with a power connection part such as a coil, or the like, for driving the aperture, the power connection part may be obstructive when a lens moves up and down during autofocusing adjustment.

Also, a function of accurately adjusting an incidence hole of the aperture module to various sizes is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing including a lens module; an aperture module disposed on the lens module and configured to form an incidence hole having various sizes through a plurality of blades; and an aperture driving part including a magnet unit including a driving magnet facing a driving coil. The magnet unit is configured to linearly reciprocate. A first blade among the plurality of blades is connected to the magnet unit, and is connected to remaining blades among the plurality of blades by a gear to transmit driving force from the magnet unit to the remaining blades.

The first blade may include a first rack gear extending in a direction parallel to a direction of movement of the magnet unit.

The gear may be a pinion gear disposed on an upper surface of a base of the aperture module.

The remaining blades may include a second blade including a second rack gear extending parallel to the first rack gear and disposed on an opposite side of the pinion gear with respect to the first rack gear. The second blade may be configured to move in a direction opposite to a direction of movement of the first blade.

The remaining blades may further include third and fourth blades respectively including third and fourth rack gears extending perpendicular to the first rack gear and disposed on opposite sides of the pinion gear with respect to each other. The third and fourth blades may be configured to move in a direction perpendicular to the direction of movement of the first blade.

A size of the incidence hole formed by the plurality of blades may be successively reduced or increased as the magnet unit moves from one side of a protrusion to another side of the protrusion opposite to the one side.

The plurality of blades may be configured to linearly move in a direction perpendicular to or parallel to a direction of movement of the magnet unit.

The aperture module may include a base on which the gear is disposed. A guide part configured to guide movement of the plurality of blades may be disposed on an upper surface of the base.

The guide part may include a recess or a hole disposed in each blade among the plurality of blades. A guide protrusion disposed on the upper surface of the base may be inserted into the guide part.

The guide protrusion may include at least two guide protrusions. When the at least two guide protrusions are connected to each other, the at least two guide protrusions may be disposed to slope to a direction of movement of the plurality of blades.

The driving coil may be disposed in the housing.

The aperture driving part may further include a position sensor disposed to face the driving magnet.

The aperture module may include a base on which the gear is disposed. The base may include a protrusion extending in an optical axis direction along a side surface of the lens module.

The magnet unit may be supported by the protrusion and may be configured to reciprocate in a direction substantially perpendicular to the optical axis direction.

A size of the incidence hole may be successively reduced or increased as the magnet unit moves from one side of the protrusion to another side of the protrusion opposite to the one side.

In another general aspect, an aperture module includes: a base; a plurality of blades sequentially stacked on an upper surface of the base and configured to linearly move perpendicular to an optical axis; and an aperture driving part supported by the base and including a magnet unit including a driving magnet facing a driving coil. The magnet unit is configured to linearly reciprocate. A first blade among the plurality of blades is connected to the magnet unit and remaining blades among the plurality of blades, and is configured to transmit driving force from the magnet unit to the remaining blades.

The base may include a rotatable gear connected to the first blade and the remaining blades. The first blade may be configured to transmit the driving force to the rotatable gear to rotate the rotatable gear. The remaining blades may be configured to linearly move perpendicular to the optical axis by the rotation of the rotatable gear.

The first blade and the remaining blades may include rack gears connected to the rotatable gear.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
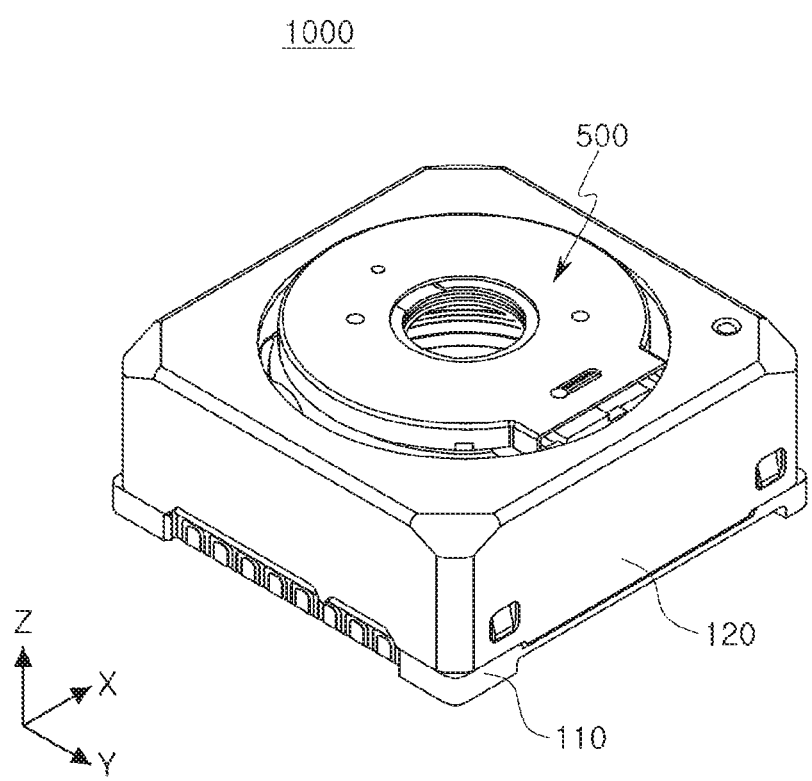
FIG. 1 is a perspective view of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module according to embodiments disclosed herein may be installed in portable electronic devices such as mobile communication terminals, smart phones, a tablet PCs, and the like.

Figure 2:
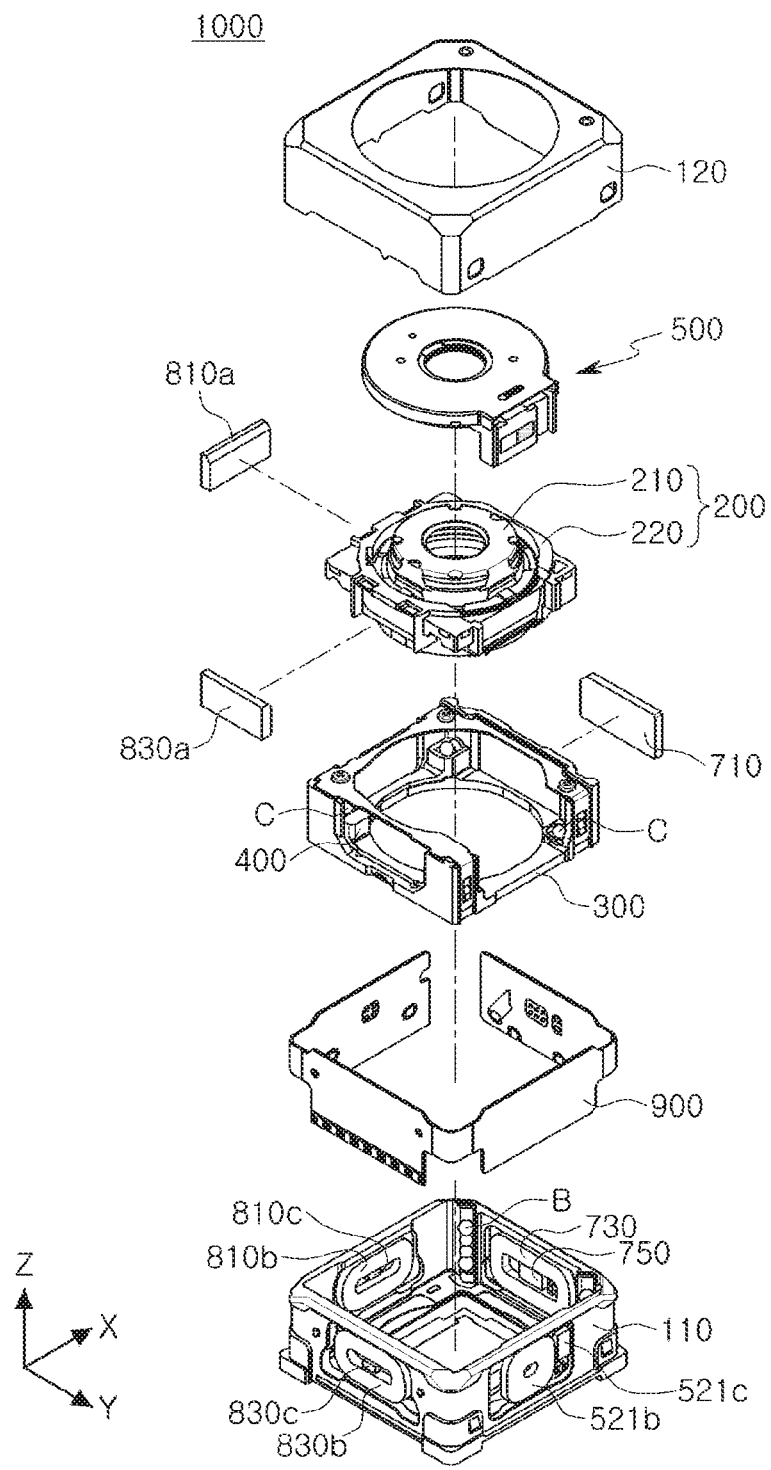
FIG. 2 is an exploded perspective view of the camera module of FIG. 1.
Figure 3A:
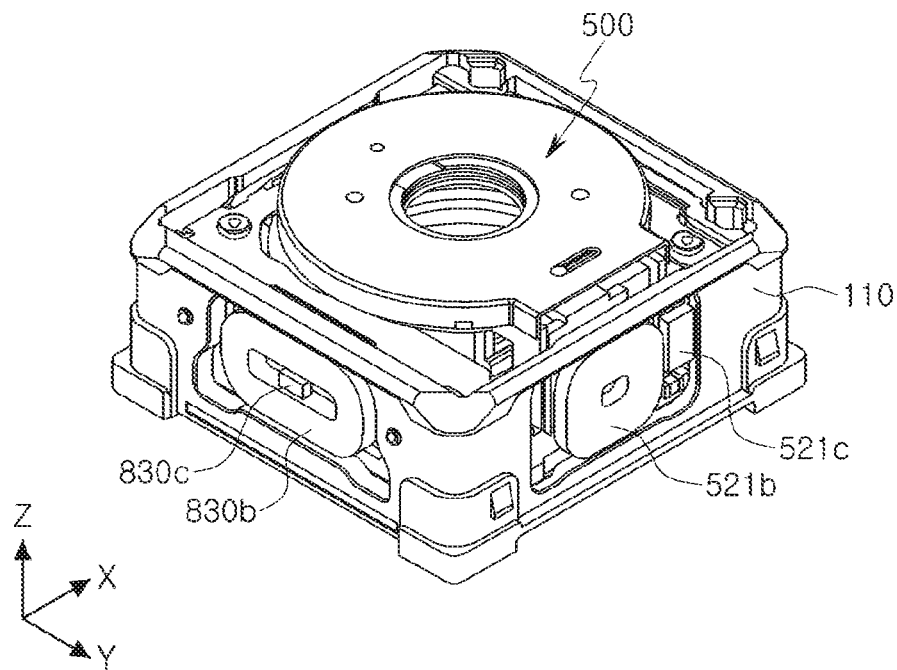
FIG. 3A is a partial perspective view of the camera module of FIG. 1.
Figure 3B:
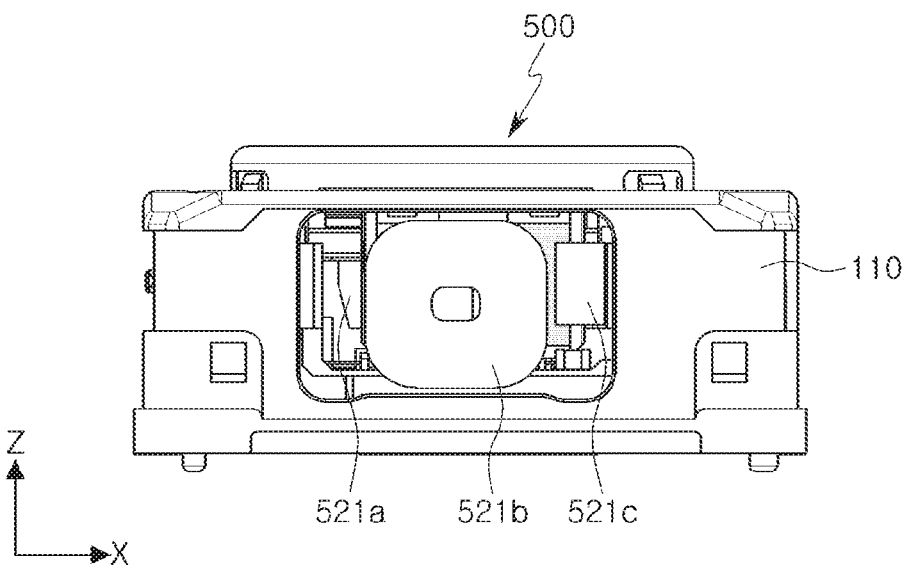
FIG. 3B is a side view of the camera module of FIG. 1.

FIG. 1 is a perspective view of a camera module 1000, according to an embodiment. FIG. 2 is an exploded perspective view of the camera module 1000. Also, FIG. 3A is a perspective view illustrating a portion of the camera module 1000, and FIG. 3B is a side view of the camera module 1000.

Referring to FIGS. 1 to 3B, the camera module 1000 includes a lens module 200, a carrier 300, a guide part 400, an aperture module (or an iris module) 500, a housing 110, and a case 120.

The lens module 200 may include a lens barrel 210 having a plurality of lenses for imaging a subject, and a holder 220 accommodating the lens barrel 210. The plurality of lenses are disposed inside the lens barrel 210 along an optical axis (corresponding to the Z direction). The lens module 200 is accommodated in the carrier 300.

The lens module 200 is movable in an optical axis direction for focus adjustment. For example, the lens module 200 may be moved, together with the carrier 300, in the optical axis direction by a focus adjusting part. The focus adjusting part includes a magnet 710 generating driving force (or power) in the optical axis direction, and a coil 730. In addition, the focus adjusting part may include a position sensor 750 (for example, a hall sensor) for sensing a position of the lens module 200 (for example, a position of the carrier 300) in the optical axis direction.

The magnet 710 is mounted on the carrier 300. For example, the magnet 710 may be mounted on one surface of the carrier 300.

The coil 730 (e.g., an AF driving coil) and the position sensor 750 are mounted on the housing 110. For example, the coil 730 and the position sensor 750 may be fixed to the housing 110 to face the magnet 710. The coil 730 and the position sensor 750 may be provided on a board 900 and the board 900 may be mounted on the housing 110.

The magnet 710 is a movable member that is mounted on the carrier 300 and moves together with the carrier 300 in the optical axis direction and the coil 730 and the position sensor 750 are stationary members fixed to the housing 110.

When power is applied to the coil 730, the carrier 300 may be moved in the optical axis direction by an electromagnetic influence between the magnet 710 and the coil 730. The position sensor 750 may sense the position of the carrier 300 in the optical axis direction.

Since the lens module 200 is accommodated in the carrier 300, the lens module 200 is also moved in the optical axis direction together with the carrier 300 according to movement of the carrier 300.

Also, the aperture module 500 mounted on an upper portion of the lens module 200 moves in the optical axis direction together with the lens module 200.

A rolling member B is disposed between the carrier 300 and the housing 110 to reduce frictional contact between the carrier 300 and the housing 110 when the carrier 300 is moved. The rolling member B may be in the form of a ball. The rolling member B is disposed on both sides of the magnet 710 (or the coil 730).

A yoke may be mounted on the board 900. For example, the yoke may be disposed to face the magnet 710 with the coil 730 interposed therebetween.

A attraction due to a magnetic force generated by the magnet 710 acts between the yoke and the magnet 710 in a direction perpendicular to the optical axis direction. Thus, the rolling member B may be maintained to be in contact with the carrier 300 and the housing 110 due to the attraction between the yoke and the magnet 710.

The yoke also allows the magnetic force of the magnet 710 to be focused. Thus, it is possible to prevent the occurrence of a leakage magnetic flux. For example, the yoke and the magnet 710 form a magnetic circuit.

In order to correct image shaking due to a user's hand motion, or the like, the lens module 200 may be moved in a first direction (e.g., the X direction) perpendicular to the optical axis and in a second direction (e.g., the Y direction) perpendicular to the optical axis and the first direction.

For example, when shaking occurs due to a user's hand motion when an image is captured, a shake correction part (or an image stabilizing part) provides the lens module 200 with a relative displacement corresponding to the shaking to compensate for the shaking.

The guide part 400 is accommodated in the carrier 300 such that the guide part 400 is mounted at an upper portion of the carrier 300 in the optical axis direction. A holder 220 is mounted on the guide part 400. Ball members C functioning as rolling bearings may be provided between the carrier 300 and the guide part 400 in the optical axis direction and between the guide part 400 and the holder 220 in the optical axis direction.

When the lens module 200 is moved in the first direction and the second direction perpendicular to the optical axis, the guide part 400 guides the lens module 200.

For example, the lens module 200 is moved in the first direction relative to the guide part 400, and the guide part 400 and the lens module 200 may be moved together in the second direction in the carrier 300.

The shake correction part includes magnets 810a and 830a, and coils 810b and 830b (i.e., first and second optical image stabilizer (OIS) driving coils), which generate driving force for shake correction. In addition, the shake correction part may include position sensors 810c and 830c (e.g., hall sensors) configured to sense positions of the lens module 200 in the first direction and the second direction.

Among the magnets 810a and 830a and the coils 810b and 830b, some magnet 810a and some coil 810b are disposed to face each other in the first direction to generate driving force in the first direction, and the other magnet 830a and the other coil 830b are disposed to face each other in the second direction to generate driving force in the second direction.

The magnets 810a and 830a are mounted on the lens module 200, and the coils 810b and 830b and the position sensors 810c and 830c respectively facing the magnets 810a and 830a are fixed to the housing 110. For example, the coils 810b and 830b and the position sensors 810c and 830c are provided on the board 900, and the board 900 is mounted on the housing 110.

The magnets 810a and 830a are movable members which move together with the lens module 200 in the first direction and the second direction, and the coils 810b and 830b and the position sensors 810c and 830c are stationary members fixed to the housing 110.

The ball members C guide the guide part 400 and the lens module 200 during a shake correction process. The ball members C may be provided between the carrier 300 and the guide part 400, between the carrier 300 and the lens module 200, and between the guide part 400 and the lens module 200.

When driving force is generated in the first direction, the ball member C disposed between the carrier 300 and the guide part 400 and between the carrier 300 and the lens module 200 is moved in a rolling manner in the first direction. Accordingly, the ball member C guides movement of the guide part 400 and the lens module 200 in the first direction.

When the driving force is generated in the second direction, the ball members C disposed between the guide part 400 and the lens module 200 and between the carrier 300 and the lens module 200 move in a rolling manner in the second direction. Accordingly, the ball members C guide movement of the lens module 200 in the second direction.

The lens module 200 and the carrier 300 are accommodated in the housing 110. For example, the housing 110 has a substantially quadrangular shape in which upper and lower portions thereof are open, and the lens module 200 and the carrier 300 are accommodated in an inner space of the housing 110.

A printed circuit board (PCB) equipped with an image sensor may be disposed below the housing 110.

The case 120 is coupled to the housing 110 to enclose an outer surface of the housing 110 and protects internal components of the camera module. In addition, the case 120 may shield electromagnetic waves.

For example, the case 120 may shield the electromagnetic waves generated in the camera module 1000 so that the electromagnetic waves do not affect other electronic components in the portable electronic device.

In addition, since the portable electronic device is equipped with various electronic components in addition to the camera module 1000, the case 120 may shield electromagnetic waves generated by the electronic components so that the electromagnetic waves generated by the electronic components do not to affect the camera module 1000.

The case 120 may be formed of a metal and may be grounded to a ground pad provided on the PCB, thereby shielding electromagnetic waves.

The aperture module 500 is a device that selectively changes an incident amount of light incident on the lens module 200. For example, the aperture module 500 may successively provide incidence holes having different sizes using a plurality of blades. Light may be incident through any of the incidence holes having various sizes depending on an imaging environment.

Figure 4:
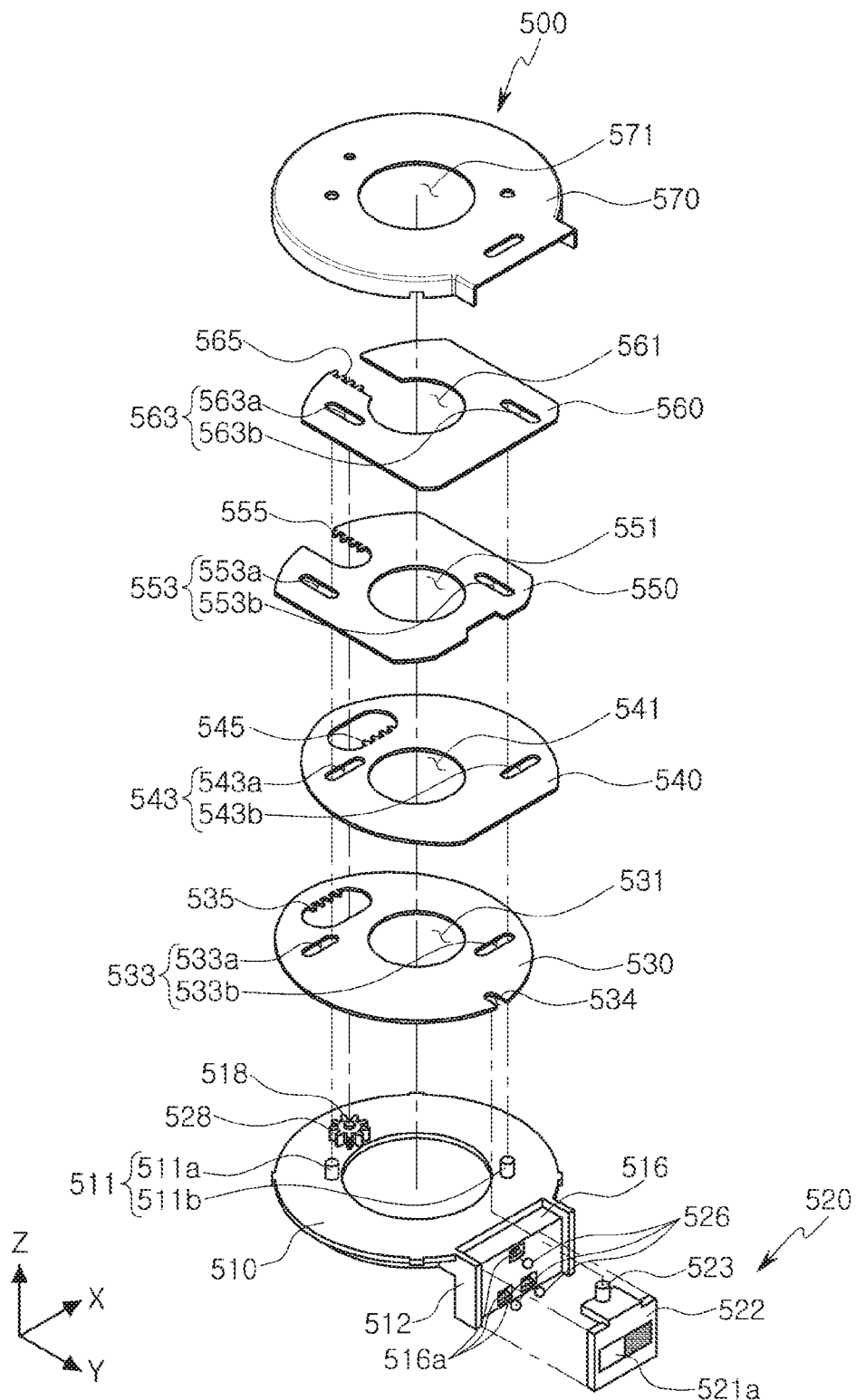
FIG. 4 is an exploded perspective view of an aperture module, according to an embodiment.

FIG. 4 is an exploded perspective view of the aperture module 500, according to an embodiment. The aperture module 500 is coupled to the lens module 200 and selectively changes an incident amount of light incident on the lens module 200.

In a high illumination environment, a relatively small amount of light may be controlled to be incident on the lens module 200, and in a low illumination environment, a relatively large amount of light may be controlled to be incident on the lens module 200. Thus, quality of an image may be maintained constant even under various conditions.

The aperture module 500 may be movable in the optical axis direction, the first direction, and the second direction in combination with the lens module 200. That is, the lens module 200 and the aperture module 500 are moved together when focus adjustment and shake correction are performed, so that a distance between the lens module 200 and the aperture module 500 does not change.

Referring to FIG. 4, the aperture module 500 includes a base 510, blades 530, 540, 550, and 560, and an aperture driving part including a magnet unit 520 including a driving magnet 521a and the driving coil 521b. The aperture module 500 may include a cover 570 covering the base 510 and the blades 530, 540, 550, and 560. The cover 570 includes a through hole 571 allowing light to be incident therethrough.

The aperture module 500 as described herein includes four blades 530, 540, 550, and 560. However, the aperture may include a different number of blades, for example, two or more blades. Hereinafter, for the purposes of description, the case in which the aperture module 500 includes the four blades 530, 540, 550, and 560 will be described as an example.

Guide protrusions 511 (511a and 511b) guiding movement of the blades 530, 540, 550, and 560 may be provided on an upper surface (object side surface) of the base 510. Since the blades 530, 540, 550, and 560 make a linear movement in a direction perpendicular to the optical axis direction, the guide protrusions 511 (511a and 511b) may be provided to guide the linear movement of the blades 530, 540, 550, and 560. In order to effectively guide the blades 530, 540, 550, and 560, at least two guide protrusions 511 (511a and 511b) may be provided. When the guide protrusions 511 (511a and 511b) are connected to each other, the guide protrusions 511 may be disposed to be sloped with respect to a direction of movement of each of the blades 530, 540, 550, and 560. In this embodiment, two guide protrusions 511 (511a and 511b) guiding movement of four blades 530, 540, 550, and 560 may be provided. However, variations including different numbers of guide protrusions and/or blades are possible.

The blades 530, 540, 550, and 560 may be sequentially stacked on the upper surface of the base 510. The blades 530, 540, 550, and 560 may be linearly moved to gather toward the optical axis or to spread out away from the optical axis. In other words, the blades 530, 540, 550, and 560 may have first to fourth through holes 531, 541, 551, and 561 (or through recesses), respectively, to form an incidence hole 191, 192, or 193 (FIGS. 8A to 9C) when overlapping each other, and the blades 530, 540, 550, and 560 may linearly move such that the centers of the through holes 531, 541, 551, and 561 move toward the optical axis or move away from the optical axis. When the respective centers of the through holes 531, 541, 551 and 561 move toward the optical axis, a largest incidence hole 191 (FIGS. 8A and 9A) may be formed, and conversely, when the respective centers of the through holes 531, 541, 551 and 561 move away from the optical axis, a smallest incidence hole 193 (FIGS. 8B and 9C) may be formed. The through holes 531, 541, 551, and 561 may have a circular shape or a polygonal shape.

Figure 9A:
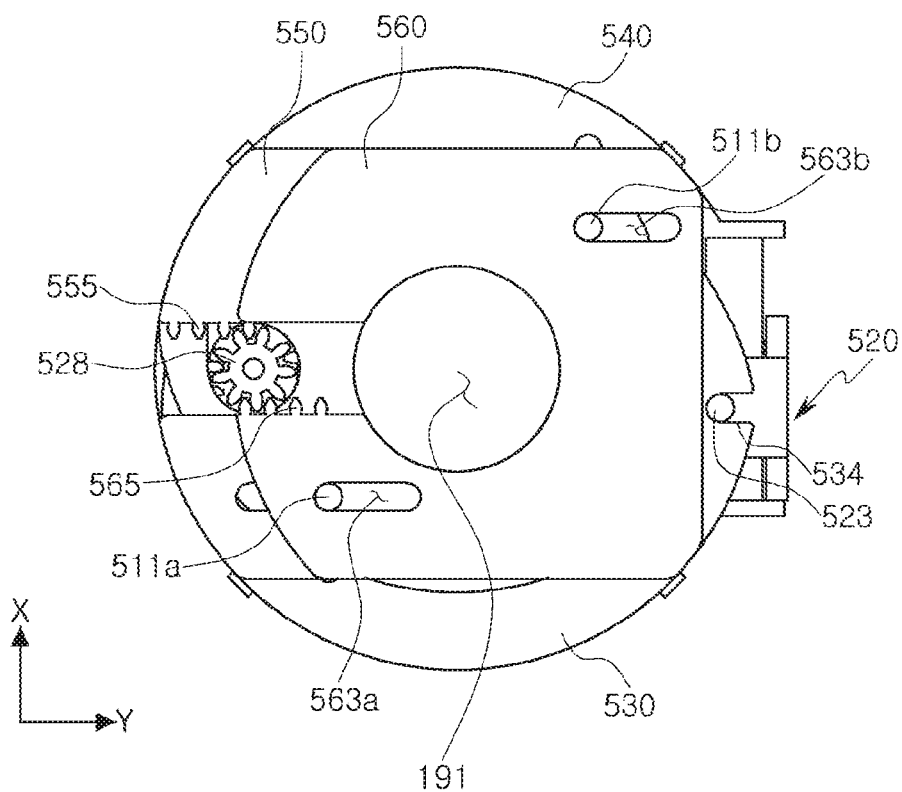
FIGS. 9A to 9C are plan views illustrating a configuration in which incidence holes of the aperture module of FIG. 4 are sequentially changed from a largest one of the incidence holes to a smallest one of the incidence holes, according to an embodiment.
Figure 9B:
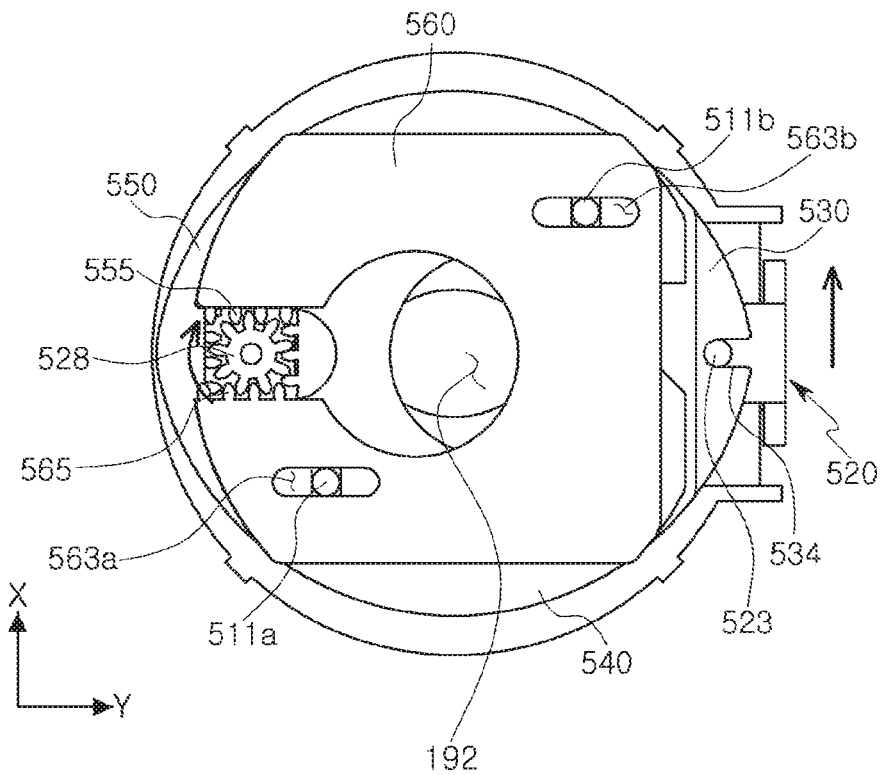
Figure 9C:
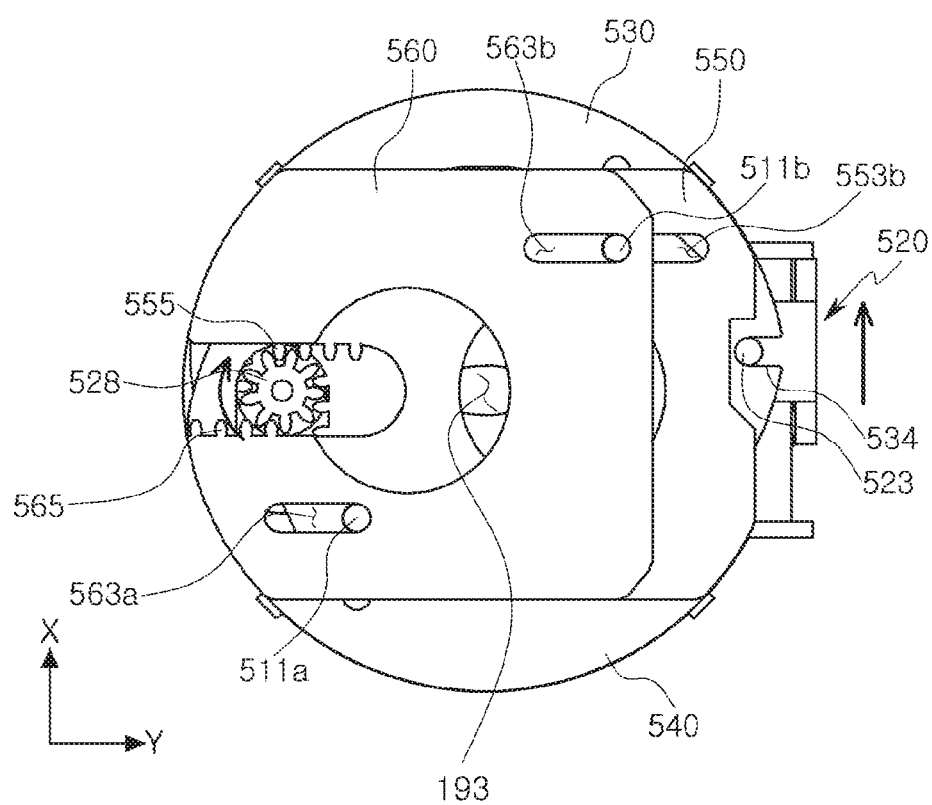

In the embodiment disclosed herein, the four blades 530, 540, 550, and 560 are equally arranged in four directions and may be linearly moved toward the optical axis or away from the optical axis (as illustrated in FIGS. 9A through 9C, the blades 530, 540, 550, and 560 may linearly move to gather toward the optical axis or spread out away from the optical axis in up/down/left/right directions in the drawings).

The blades 530, 540, 550, and 560 may have respective guide portions 533, 543, 553, and 563 having a recess or hole shape allowing the guide protrusions 511 (511a and 511b) provided on the upper surface of the base 510 to be inserted therein to guide linear movement. The guide portions 533, 543, 553, and 563 may extend in a direction in which the respective blades 530, 540, 550, and 560 move and may be provided at positions of the respective blades 530, 540, 550, and 560 to correspond to the shape and the number of the guide protrusions 511 (511a and 511b). In this manner, as the guide portions 533, 543, 553, and 563 are fitted to the guide protrusions 511 (511a and 511b), each of the blades 530, 540, 550, and 560 may be restricted to linearly move only in one direction perpendicular to the optical axis.

The first blade 530 may be a driving blade 530 directly interworking with the magnet unit 520. That is, the first blade 530 is directly connected to the magnet unit 520 to directly receive a driving force applied by the magnet unit 520. Also, the second to fourth blades 540, 550, and 560 may be driven cooperatively with the first blade 530. Specifically, the second to fourth blades 540, 550, and 560 are connected to the first blade 530 by a gear 528, so that driving force may be transmitted from the first blade 530 to the second to fourth blades 540, 550, and 560. In FIGS. 4 to 9C, the lowermost one of the four blades 530, 540, 550, and 560 is referred to as a first blade and the first blade is a driving blade, but the gear 528 may interwork with any one of the first to fourth blades 530, 540, 550, and 560, and thus, the driving blade may be any one of the first to fourth blades 530, 540, 550, and 560. In addition, an order of stacking of the first to fourth blades 530, 540, 550, and 560 described below may be arbitrarily changed.

As shown in FIG. 4, the first blade 530 has a drive recess 534 into which the driving protrusion 523 of the magnet unit 520 is fitted. When the magnet unit 520 linearly moves in a direction perpendicular to the optical axis direction, the first blade 530 also linearly moves in the same direction.

The first blade 530, which is a driving blade, may include a first rack gear 535 extending in a direction parallel to a direction of movement of the magnet unit 520. The first rack gear 535 is engaged with a pinion gear 528 provided on the upper surface of the base 510. The pinion gear 528 may be rotatably fitted and fixed to a rotary shaft 518 provided on the upper surface of the base 510.

When the first blade 530 linearly moves, the pinion gear 528 interworking with the first rack gear 535 cooperatively rotates with the linear movement of the first blade 530.

The second blade 540 includes a second rack gear 545 extending in a direction parallel to the direction in which the first rack gear 535 extends, and disposed on an opposite side of the pinion gear 528 with respect to the first rack gear 535. The second rack gear 545 is engaged with the pinion gear 528 and cooperatively linearly moves in a direction opposite to the direction of movement of the first blade 530, with the rotation of the first rack gear 535. Accordingly, the second blade 540 linearly moves in the direction opposite to the direction of movement of the first blade 530 in accordance with movement of the first blade 530.

The third blade 550 has a third rack gear 555 extending in a direction perpendicular to the direction in which the first rack gear 535 extends. The third rack gear 555 is also engaged with the pinion gear 528 to cooperatively linearly move in a direction perpendicular to the direction of movement of the first blade 530.

The fourth blade 560 includes a fourth rack gear 565 extending in a direction perpendicular to the direction in which the first rack gear 535 extends, or in a direction parallel to the direction in which the third rack gear 555 extends, and disposed on an opposite side of the pinion gear 528 with respect to the third rack gear 555. The fourth rack gear 565 is also engaged with the pinion gear 528 to cooperatively linearly move in a direction opposite to the direction of movement of the third blade 550.

Accordingly, the first blade 530, which is a driving blade, moves linearly in accordance with a linear movement of the magnet unit 520, and the second to fourth blades 540, 550, and 560 cooperatively operated by the pinion gear 528 linearly move together. Accordingly, the first to fourth blades 530, 540, 550, and 560 may contract inwards or expand outwards to successively provide incidence holes 191, 192, and 193 (FIGS. 8A to 9C) having various sizes.

The aperture driving part includes the magnet unit 520 disposed on the base 510 so as to be movable along one axis, and the driving coil 521b fixed to the housing 110 to face the magnet unit 520.

The driving coil 521b is provided on the board 900 and the board 900 is fixed to the housing 110. The board 900 may be electrically connected to a printed circuit board (PCB) attached to the bottom of the camera module 1000.

The magnet unit 520 is a moving member that moves together with the base 510 in the optical axis direction, the first direction, and the second direction, and the driving coil 521b is a stationary member fixed to the housing 110.

Since the driving coil 521b providing driving force to the aperture module 500 is disposed outside the aperture module 500, i.e., on the housing 110 of the camera module, the weight of the aperture module 500 may be reduced.

In other words, since the driving coil 521b providing driving force to the aperture module 500 is provided as a stationary member, the driving coil 521b is not moved during autofocusing or optical image stabilizer (OIS) driving, and thus, an increase in weight of the lens module 200 due to adoption of the lens module 500 may be minimized.

Also, since the driving coil 521b for providing driving force to the aperture module 500 is disposed in the housing 110, which is the stationary member and is electrically connected to the PCB, although the lens module 200 and the aperture module 500 are moved during autofocusing or shake correction, the movement of the lens module 200 and the aperture module 500 does not affect the driving coil 521b of the aperture driving part.

Thus, a degradation of the autofocusing adjustment function may be prevented.

Also, since incidence holes 191, 192, and 193 of different sizes are successively formed, it is necessary to accurately sense a position of the magnet unit 520 in order to accurately form the incidence hole 191, 192, or 193 of a correct size. Thus, the aperture module 500 may include a position sensor 521c (FIGS. 3A and 3B) disposed to face the driving magnet 521a of the magnet unit 520 to determine a position of the driving magnet 521a. The position sensor 521c may be a hall sensor, and may be installed to be fixed to the housing 110 at the center of or adjacent to the driving coil 521b. For example, the position sensor 521c may be provided together on the board 900 on which the driving coil 521b is provided.

The aperture module 500 uses a closed-loop control scheme of sensing a position of the magnet unit 520 and feeding the same back when the magnet unit 520 is linearly moved. Thus, the position sensor 521c is required for closed-loop controlling.

The board 900 may include a gyro sensor (not shown) for sensing a shake factor such as a user's hand motion, or the like, and a driving circuit element (i.e., a driver IC) (not shown) providing a driving signal to the coils 810b, 830b, 730, and 521b.

As shown in FIG. 4, the base 510 includes a protrusion 512 in which the magnet unit 520 is disposed. The protrusion 512 may have a shape extending from the base 510 in the optical axis direction.

The magnet unit 520 includes the driving magnet 521a disposed to face the driving coil 521b and a magnet holder 522 to which the driving magnet 521a is attached. The driving magnet 521a is provided to face the driving coil 521b in a direction perpendicular to the optical axis direction.

The magnet unit 520 is coupled with the protrusion 512 of the base 510. The lens module 200 may have a yoke (not shown) at a position opposite to the magnet unit 520. Alternatively, the protrusion 512 of the base 510 may have a yoke (not shown). The magnet unit 520 may slide due to attraction between the yoke (not shown) and the driving magnet 521a, while being maintained in a state of being in close contact with the protrusion 512.

The base 510 may have a support member 516 supporting the magnet unit 520 so that the magnet unit 520 may easily slide. The support member 516 may have a rod or plate-like shape to facilitate sliding.

A ball bearing 526 may be interposed between the support member 516 and the magnet unit 520 to facilitate movement of the magnet unit 520 so that the magnet unit 520 may slide or move in a rolling manner. The support member 516 may have a seating recess 516a on which the ball bearing 526 is seated.

When power is applied to the driving coil 521b, the magnet unit 520 may be moved on the support 516 in a direction perpendicular to the optical axis direction by an electromagnetic influence between the driving magnet 521a and the driving coil 521b.

Figure 5A:
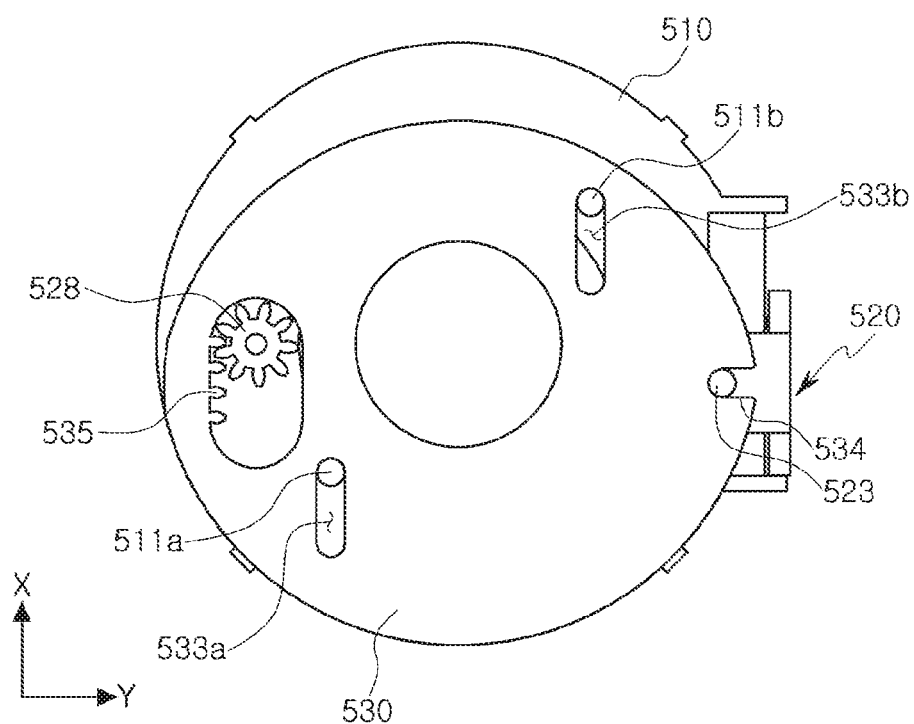
FIGS. 5A and 5B are plan views illustrating a configuration in which a first blade of the aperture module of FIG. 4 is driven, according to an embodiment.
Figure 5B:
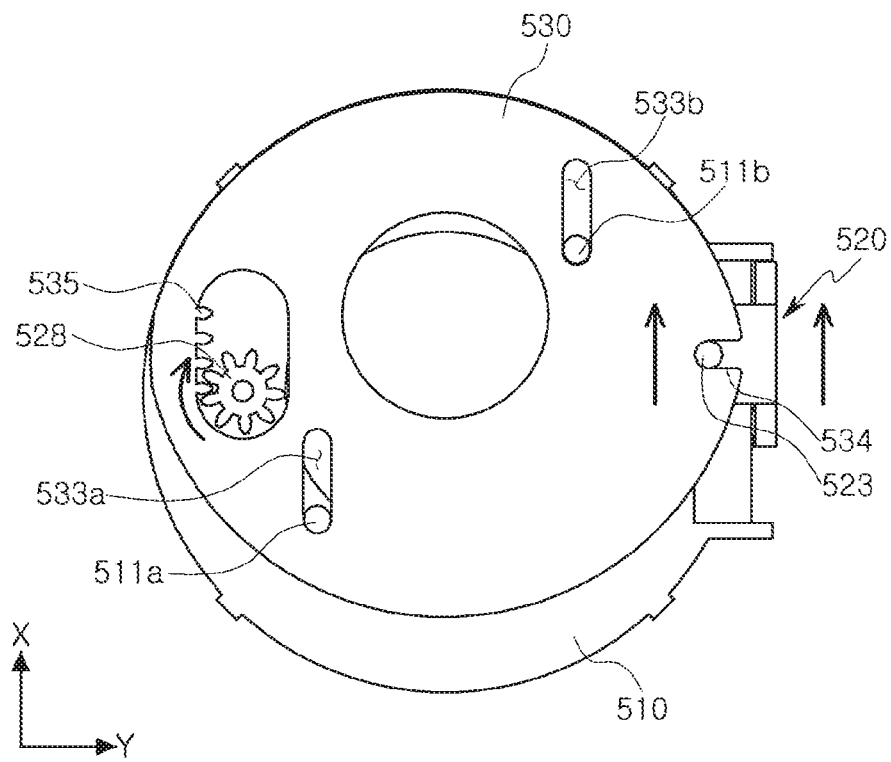

Referring to FIGS. 5A and 5B, as the magnet unit 520 moves upwards (X axis) in the drawing, the first blade 530, which is a driving blade, moves upwards (FIG. 5A→FIG. 5B).

Figure 6A:
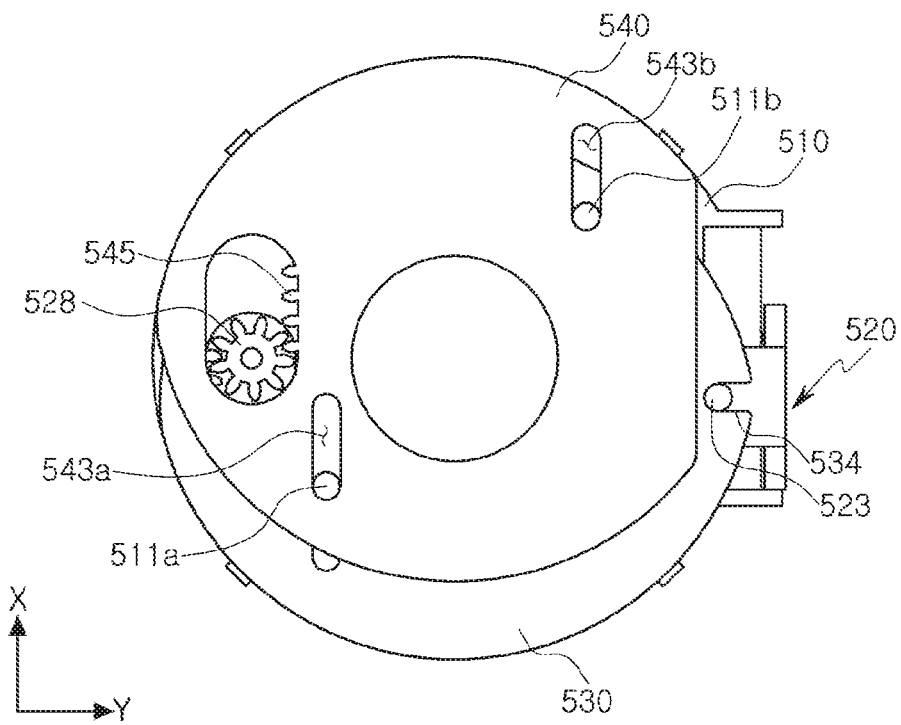
FIGS. 6A and 6B are plan views illustrating a configuration in which the first blade and a second blade of the aperture module of FIG. 4 are driven, according to an embodiment.
Figure 6B:
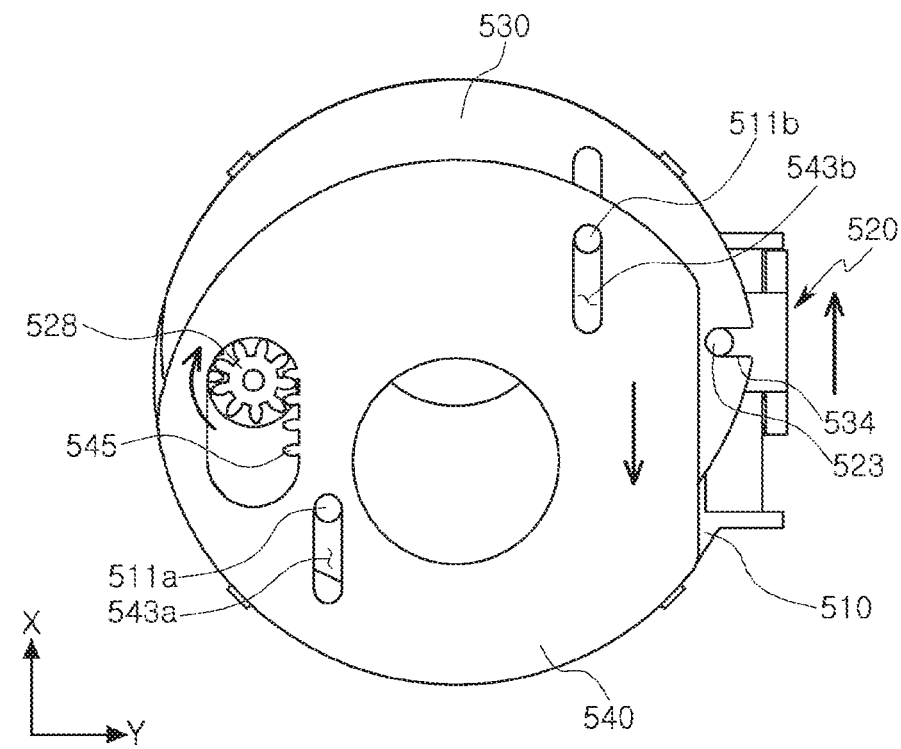

Referring to FIGS. 6A and 6B, as the magnet unit 520 moves upwards in the drawing, the second blade 540, which is connected to the first blade 530 by the gear 528, may move downwards (X axis) (FIG. 6A→FIG. 6B).

Figure 7A:
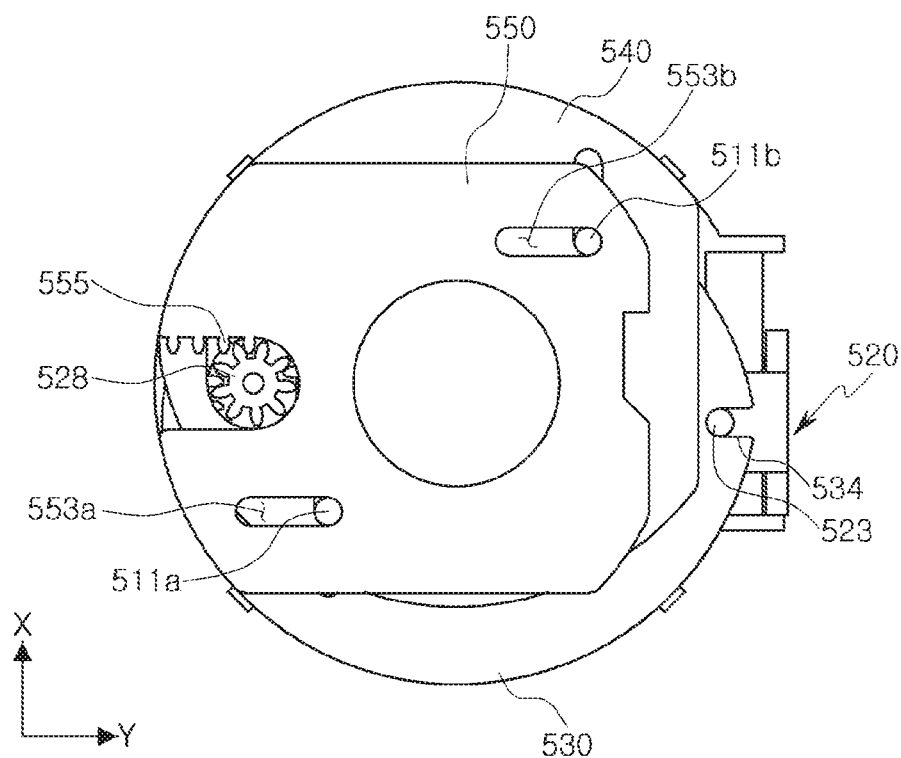
FIGS. 7A and 7B are plan views illustrating a configuration in which first to third blades of the aperture module of FIG. 4 are driven, according to an embodiment.
Figure 7B:
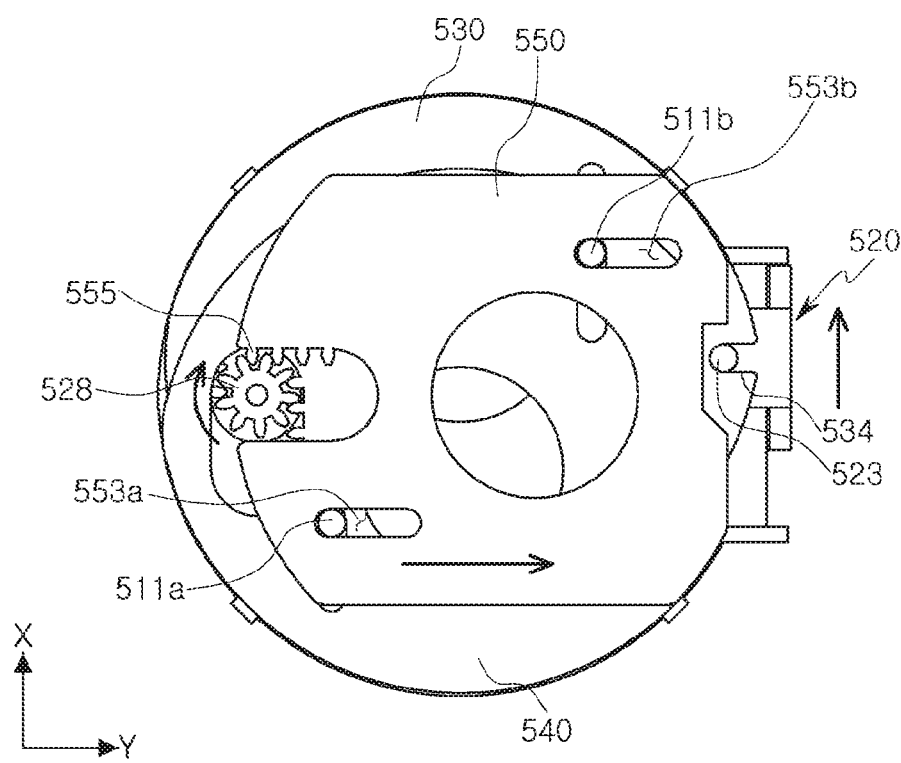

Referring to FIGS. 7A and 7B, as the magnet unit 520 moves upwards in the drawing, the third blade 550, which is connected to the first blade 530 by the gear 528, may move to the right (Y axis) (FIG. 7A→FIG. 7B).

Figure 8A:
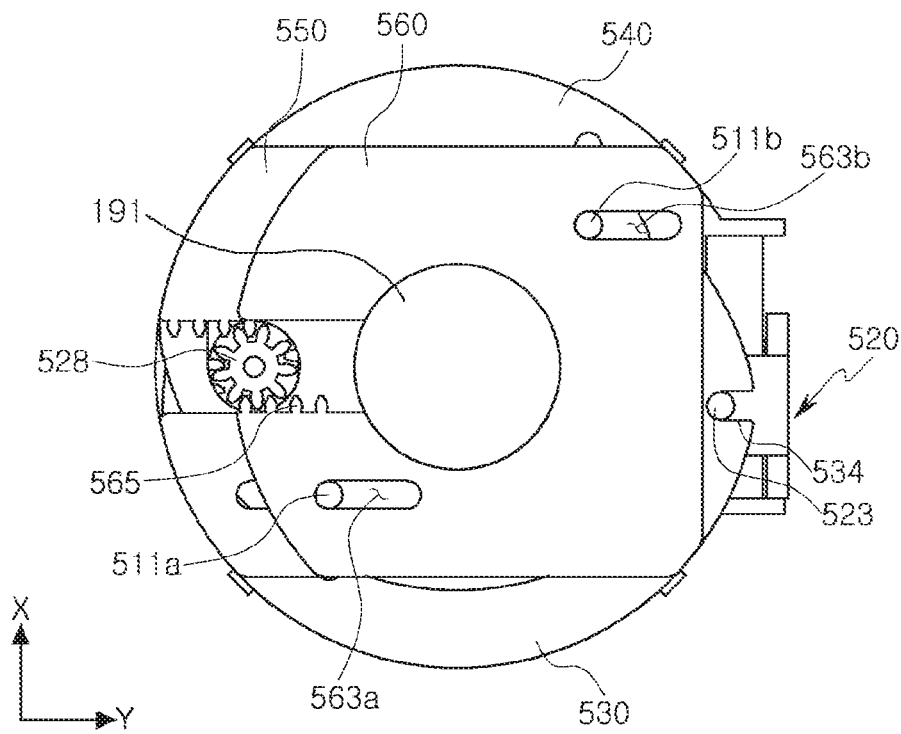
FIGS. 8A and 8B are plan views illustrating a configuration in which first to fourth blades of the aperture module of FIG. 4 are driven, according to an embodiment.
Figure 8B:
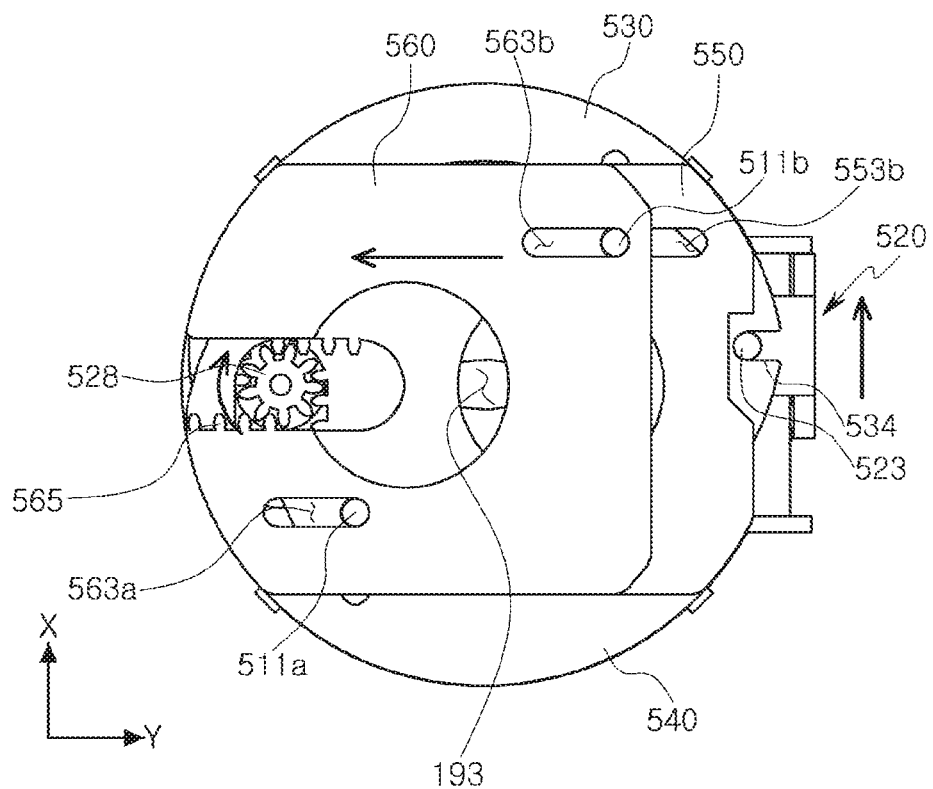

Referring to FIGS. 8A and 8B, as the magnet unit 520 moves upwards in the drawing, the fourth blade 560, which is connected to the first blade 530 by the gear 528, may move to the left (Y axis) (FIG. 8A→FIG. 8B).

Thus, as illustrated in FIGS. 9A through 9C, as the magnet unit 520 moves upwards in the drawing, the first to fourth blades 530, 540, 550, and 560 move and the centers of the first to fourth through holes 531, 541, 551, and 561 are shifted in a staggered manner so that the size of the incidence hole may be gradually reduced, and conversely, as the magnet unit 520 moves downwards, the first to fourth blades 530, 540, 550, and 560 move and the centers of the first to fourth through holes 531, 541, 551, and 561 may be aligned with each other so that the size of the incidence hole may be gradually enlarged. That is, as the magnet unit 520 moves upwards, the incidence holes 191, 192, and 193 of decreasing size are successively formed and, as the magnet unit 520 moves downwards, the incidence holes 193, 192, and 191 of increasing size are successively formed.

The aperture of the disclosed embodiments may be controlled by designating desired aperture adjustment stages as necessary (for example, three stages) so that each stage may be realized. Alternatively, the size of the incidence hole of the aperture may be adjusted continuously without designating stages.

As set forth above, a camera module disclosed herein minimizes an increase in weight of a driving part although an aperture module is mounted, and may maintain the performance of an autofocusing and optical image stabilizer (OIS) function.

In addition, the disclosed embodiments may provide various sizes of incidence holes accurately by a simple structure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing comprising a lens module;
an aperture module disposed on the lens module and configured to form an incidence hole having various sizes through a plurality of blades; and
an aperture driving part comprising a magnet unit including a driving magnet facing a driving coil, the magnet unit being configured to reciprocate along a linear path,
wherein a first blade among the plurality of blades is connected to the magnet unit, and is connected to remaining blades among the plurality of blades by a gear to transmit driving force from the magnet unit to the remaining blades.

2. The camera module of claim 1, wherein the first blade includes a first rack gear extending in a direction parallel to a direction of movement of the magnet unit.

3. The camera module of claim 2, wherein the gear is a pinion gear disposed on an upper surface of a base of the aperture module.

4. The camera module of claim 3, wherein:
the remaining blades comprise a second blade including a second rack gear extending parallel to the first rack gear and disposed on an opposite side of the pinion gear with respect to the first rack gear, and
the second blade is configured to move in a direction opposite to a direction of movement of the first blade.

5. The camera module of claim 4, wherein:
the remaining blades further comprise third and fourth blades respectively including third and fourth rack gears extending perpendicular to the first rack gear and disposed on opposite sides of the pinion gear with respect to each other, and
the third and fourth blades are configured to move in a direction perpendicular to the direction of movement of the first blade.

6. The camera module of claim 1, wherein a size of the incidence hole formed by the plurality of blades is successively reduced or increased as the magnet unit moves from one side of a protrusion to another side of the protrusion opposite to the one side.

7. The camera module of claim 1, wherein the plurality of blades are configured to linearly move in a direction perpendicular to or parallel to a direction of movement of the magnet unit.

8. The camera module of claim 7, wherein:
the aperture module comprises a base on which the gear is disposed, and
a guide part configured to guide movement of the plurality of blades is disposed on an upper surface of the base.

9. The camera module of claim 8, wherein:
the guide part comprises a recess or a hole disposed in each blade among the plurality of blades, and a guide protrusion disposed on the upper surface of the base is inserted into the guide part.

10. The camera module of claim 9, wherein:
the guide protrusion comprises at least two guide protrusions, and
when the at least two guide protrusions are connected to each other, the at least two guide protrusions are disposed to be sloped with respect to a direction of movement of the plurality of blades.

11. The camera module of claim 1, wherein the driving coil is disposed in the housing.

12. The camera module of claim 1, wherein the aperture driving part further comprises a position sensor disposed to face the driving magnet.

13. The camera module of claim 1, wherein:
the aperture module comprises a base on which the gear is disposed, and
the base comprises a protrusion extending in an optical axis direction along a side surface of the lens module.

14. The camera module of claim 13, wherein the magnet unit is supported by the protrusion and is configured to reciprocate in a direction substantially perpendicular to the optical axis direction.

15. The camera module of claim 14, wherein a size of the incidence hole is successively reduced or increased as the magnet unit moves from one side of the protrusion to another side of the protrusion opposite to the one side.

16. The camera module of claim 1, wherein the aperture module is configured to move in an optical axis direction with the lens module.

17. An aperture module, comprising:
a base;
a plurality of blades sequentially stacked on an upper surface of the base and comprising respective through holes; and
an aperture driving part supported by the base and comprising a magnet unit including a driving magnet facing a driving coil, the magnet unit being configured to move to generate driving force, in response to interaction between the driving magnet and the driving coil,
wherein the plurality of blades are configured to move perpendicular to an optical axis is response to the driving force, such that centers of the respective through holes move along respective linear paths perpendicular to the optical axis.

18. The aperture module of claim 17, wherein a first blade among the plurality of blades is connected to the magnet unit and remaining blades among the plurality of blades, and is configured to transmit the driving force from the magnet unit to the remaining blades.

19. The aperture module of claim 18, wherein:
the base comprises a rotatable gear connected to the first blade and the remaining blades;
the first blade is further configured to transmit the driving force to the rotatable gear to rotate the rotatable gear; and
the remaining blades are configured to linearly move perpendicular to the optical axis by the rotation of the rotatable gear.

20. The aperture module of claim 19, wherein the first blade and the remaining blades comprise rack gears connected to the rotatable gear.

21. A camera module, comprising:
a housing comprising a lens module;
an aperture module disposed on the lens module and configured to form an incidence hole having various sizes through a plurality of blades; and
an aperture driving part comprising a magnet unit including a driving magnet facing a driving coil, the magnet unit being configured to move in a reciprocating manner;
wherein a first blade among the plurality of blades is connected to the magnet unit, and includes a first rack gear engaged with a rotatable gear to transmit driving force from the magnet unit to remaining blades among the plurality of blades, and
wherein the remaining blades comprise a second blade including a second rack gear engaged with the rotatable gear.

22. A camera module, comprising:
a housing comprising a lens module;
an aperture module disposed on the lens module and configured to form an incidence hole having various sizes through a plurality of blades, the aperture module comprising a base on which a gear is disposed;
a guide part disposed on an upper surface of the base and configured to guide movement of the plurality of blades, the guide part comprising a recess or a hole disposed in each blade among the plurality of blades;
at least two guide protrusions disposed on the upper surface of the base and inserted into the guide part, the at least two guide protrusions being connected to each other and disposed to be sloped with respect to a direction of movement of the plurality of blades; and
an aperture driving part comprising a magnet unit including a driving magnet facing a driving coil, the magnet unit being configured to move in a reciprocating manner,
wherein a first blade among the plurality of blades is connected to the magnet unit, and is connected to remaining blades among the plurality of blades by the gear to transmit driving force from the magnet unit to the remaining blades.

23. An aperture module, comprising:
a base comprising a rotatable gear;
a plurality of blades sequentially stacked on an upper surface of the base and configured to move perpendicular to an optical axis; and
an aperture driving part supported by the base and comprising a magnet unit including a driving magnet facing a driving coil, the magnet unit being configured to move in a reciprocating manner,
wherein a first blade among the plurality of blades is connected to the magnet unit, and comprises a rack gear connected to the rotatable gear to transmit driving force from the magnet unit to remaining blades among the plurality of blades, and
wherein the remaining blades comprise rack gears connected to the rotatable gear.

* * * * *